US010027582B2

United States Patent
Richardson et al.

(10) Patent No.: US 10,027,582 B2
(45) Date of Patent: **\*Jul. 17, 2018**

(54) UPDATING ROUTING INFORMATION BASED ON CLIENT LOCATION

(71) Applicant: Amazon Technologies, Inc., Seattle, WA (US)

(72) Inventors: David R. Richardson, Seattle, WA (US); Bradley Eugene Marshall, Bainbridge Island, WA (US); Swaminathan Sivasubramanian, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/673,743

(22) Filed: Mar. 30, 2015

(65) Prior Publication Data

US 2015/0207733 A1    Jul. 23, 2015

Related U.S. Application Data

(63) Continuation of application No. 13/829,518, filed on Mar. 14, 2013, now Pat. No. 9,021,127, which is a
(Continued)

(51) Int. Cl.
*H04L 12/741* (2013.01)
*H04L 29/12* (2006.01)
(Continued)

(52) U.S. Cl.
CPC ........ *H04L 45/74* (2013.01); *H04L 29/12066* (2013.01); *H04L 61/15* (2013.01);
(Continued)

(58) Field of Classification Search
CPC ... H04L 29/12066; H04L 45/74; H04L 61/15; H04L 61/1511; H04L 61/609; H04L 67/18
(Continued)

(56) References Cited

U.S. PATENT DOCUMENTS 5,063,500 A    11/1991  Shorter
5,341,477 A    8/1994   Pitkin et al.
(Continued)

FOREIGN PATENT DOCUMENTS

CA    2741 895 A1    5/2010
CN    1422468 A      6/2003
(Continued)

OTHER PUBLICATIONS

Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
(Continued)

*Primary Examiner* — Alina A Boutah
(74) *Attorney, Agent, or Firm* — Knobbe Martens Olson & Bear LLP

(57) ABSTRACT

A system, method, and computer-readable medium for updating request routing information associated with client location information are provided. A content delivery network service provider receives a DNS query from a client computing device. The DNS query corresponds to a resource identifier for requested content from the client computing device. The content delivery network service provider obtains a query IP address corresponding to the client computing device. Based on routing information associated with the query IP address, the content delivery network service provider routes the DNS query. The process further
(Continued)

includes monitoring performance data associated with the transmission of the requested resource and updating routing information associated with the query IP address based on the performance data for use in processing subsequent requests from the client computing device.

22 Claims, 9 Drawing Sheets

Related U.S. Application Data continuation of application No. 13/529,831, filed on Jun. 21, 2012, now Pat. No. 8,423,667, which is a continuation of application No. 13/165,484, filed on Jun. 21, 2011, now Pat. No. 8,234,403, which is a continuation of application No. 12/272,683, filed on Nov. 17, 2008, now Pat. No. 7,991,910.

(51) Int. Cl.
  *H04W 4/02* (2018.01)
  *H04L 29/08* (2006.01)
  *H04L 29/14* (2006.01)

(52) U.S. Cl.
  CPC ........ *H04L 61/1511* (2013.01); *H04L 61/609* (2013.01); *H04L 67/18* (2013.01); *H04L 69/40* (2013.01); *H04W 4/02* (2013.01); *H04L 67/306* (2013.01)

(58) Field of Classification Search
  USPC ................................................. 709/238, 245
  See application file for complete search history.

(56) References Cited

U.S. PATENT DOCUMENTS

| | | |
|---|---|---|
| 5,459,837 A | 10/1995 | Caccavale |
| 5,611,049 A | 3/1997 | Pitts |
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 5/1999 | Russell et al. |
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |
| 5,999,274 A | 12/1999 | Lee et al. |
| 6,016,512 A | 1/2000 | Huitema |
| 6,018,619 A | 1/2000 | Allard et al. |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A * | 11/2000 | Ansell ............... G06F 17/30876 707/E17.112 |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 7/2005 | Orbits et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |

(56) References Cited

U.S. PATENT DOCUMENTS

| | | |
|---|---|---|
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 * | 3/2008 | Lisiecki ............. G06F 17/3089 370/227 |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |

(56) References Cited

U.S. PATENT DOCUMENTS

| | | |
|---|---|---|
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 * | 12/2011 | Averbuj ............... H04L 67/327 709/203 |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,199 B1 | 4/2012 | Hoche-Mong et al. |
| 8,156,243 B2 | 4/2012 | Richardson et al. |
| 8,175,863 B1 | 5/2012 | Ostermeyer et al. |
| 8,190,682 B2 | 5/2012 | Paterson-Jones et al. |
| 8,195,837 B2 | 6/2012 | McCarthy et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,301,645 B1 | 10/2012 | Crook |
| 8,321,568 B2 | 11/2012 | Sivasubramanian et al. |
| 8,380,831 B2 | 2/2013 | Barber |
| 8,402,137 B2 | 3/2013 | Sivasuramanian et al. |
| 8,423,408 B1 | 4/2013 | Barnes et al. |
| 8,433,749 B2 | 4/2013 | Wee et al. |
| 8,447,831 B1 * | 5/2013 | Sivasubramanian H04L 61/1511 709/216 |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,880 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,904,009 B1 | 12/2014 | Marshall et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,949,459 B1 | 2/2015 | Scholl |
| 8,966,318 B1 | 2/2015 | Shah |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,116,803 B1 | 8/2015 | Agrawal et al. |
| 9,130,756 B2 | 9/2015 | Richardson et al. |
| 9,130,977 B2 | 9/2015 | Zisapel et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |

(56) References Cited

U.S. PATENT DOCUMENTS

| | | | |
|---|---|---|---|
| 9,210,235 B2 | 12/2015 | Sivasubramanian et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,386,038 B2 | 7/2016 | Martini |
| 9,391,949 B1 | 7/2016 | Richardson et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,554 B2 | 4/2017 | Marshall et al. |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Jun-hyeong |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1* | 6/2002 | Biliris ............... H04L 29/06 709/238 |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0087374 A1 | 7/2002 | Boubez et al. |
| 2002/0091786 A1 | 7/2002 | Yamaguchi et al. |
| 2002/0091801 A1* | 7/2002 | Lewin ............... H04L 29/06 709/219 |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0143675 A1 | 10/2002 | Orshan |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1* | 11/2002 | Beaumont ......... H04L 29/12066 709/245 |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0074401 A1 | 4/2003 | Connell et al. |
| 2003/0074471 A1 | 4/2003 | Anderson et al. |
| 2003/0074472 A1* | 4/2003 | Lucco ............... H04L 29/12066 709/245 |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |

(56) References Cited

U.S. PATENT DOCUMENTS

| | | |
|---|---|---|
| 2003/0200394 A1 | 10/2003 | Ashmore et al. |
| 2003/0204602 A1 | 10/2003 | Hudson et al. |
| 2003/0229682 A1* | 12/2003 | Day .................. H04L 29/06 709/219 |
| 2003/0233423 A1* | 12/2003 | Dilley ............... H04L 29/06 709/214 |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010563 A1 | 1/2004 | Forte et al. |
| 2004/0010588 A1 | 1/2004 | Slater et al. |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1* | 4/2004 | Kloninger ........... H04L 12/2602 709/200 |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1* | 4/2004 | Sundaram ......... H04L 29/12132 709/224 |
| 2004/0083307 A1 | 4/2004 | Uysal |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1* | 10/2004 | Parikh ............... H04L 29/06027 709/219 |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198334 A1 | 9/2005 | Farber et al. |
| 2005/0198571 A1 | 9/2005 | Kramer et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1* | 10/2005 | Swildens ............ G06F 9/50 709/200 |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0136453 A1 | 6/2006 | Kwan |
| 2006/0143293 A1 | 6/2006 | Freedman |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |

(56) References Cited

U.S. PATENT DOCUMENTS

| | | |
|---|---|---|
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218256 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1* | 2/2008 | Padmanabhan ......... H04L 45/04 370/389 |
| 2008/0046550 A1 | 2/2008 | Mazur et al. |
| 2008/0046596 A1 | 2/2008 | Afergan et al. |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1* | 3/2008 | Crayford ............ H04L 29/06027 725/86 |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1* | 4/2008 | Raciborski ........ H04L 29/12066 709/245 |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0263135 A1 | 10/2008 | Olliphant |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |

(56) References Cited

U.S. PATENT DOCUMENTS

| | | |
|---|---|---|
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0138533 A1 | 5/2009 | Iwasaki et al. |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248697 A1* | 10/2009 | Richardson ......... G06F 12/0813 |
| 2009/0248786 A1* | 10/2009 | Richardson ....... H04L 29/12066 709/201 |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1* | 10/2009 | Richardson ........... H04L 67/327 709/239 |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1* | 12/2009 | Sivasubramanian   H04L 29/12132 709/238 |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0057894 A1 | 3/2010 | Glasser |
| 2010/0070603 A1 | 3/2010 | Moss et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0051738 A1 | 3/2011 | Xu |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |

(56) References Cited

U.S. PATENT DOCUMENTS

| | | |
|---|---|---|
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0036238 A1 | 2/2012 | Sundaram et al. |
| 2012/0066360 A1 | 3/2012 | Ghosh |
| 2012/0072600 A1 | 3/2012 | Richardson et al. |
| 2012/0078998 A1 | 3/2012 | Son et al. |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0110515 A1 | 5/2012 | Abramoff et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0224516 A1 | 9/2012 | Stojanovski et al. |
| 2012/0226649 A1 | 9/2012 | Kovacs et al. |
| 2012/0233522 A1 | 9/2012 | Barton et al. |
| 2012/0233668 A1 | 9/2012 | Leafe et al. |
| 2012/0254961 A1 | 10/2012 | Kim et al. |
| 2012/0257628 A1 | 10/2012 | Bu et al. |
| 2012/0278831 A1 | 11/2012 | van Coppenolle et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0019311 A1 | 1/2013 | Swildens et al. |
| 2013/0034099 A1 | 2/2013 | Hikichi et al. |
| 2013/0041872 A1 | 2/2013 | Aizman et al. |
| 2013/0046869 A1 | 2/2013 | Jenkins et al. |
| 2013/0054675 A1 | 2/2013 | Jenkins et al. |
| 2013/0055374 A1 | 2/2013 | Kustarz et al. |
| 2013/0067530 A1 | 3/2013 | Spektor et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0086001 A1 | 4/2013 | Bhogal et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0263256 A1 | 10/2013 | Dickinson et al. |
| 2013/0268616 A1 | 10/2013 | Sakata et al. |
| 2013/0279335 A1 | 10/2013 | Ahmadi |
| 2013/0305046 A1 | 11/2013 | Mankovski et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0006577 A1 | 1/2014 | Joe et al. |
| 2014/0007239 A1 | 1/2014 | Sharpe et al. |
| 2014/0019605 A1 | 1/2014 | Boberg |
| 2014/0036675 A1 | 2/2014 | Wang et al. |
| 2014/0040478 A1 | 2/2014 | Hsu et al. |
| 2014/0053022 A1 | 2/2014 | Forgette et al. |
| 2014/0059120 A1 | 2/2014 | Richardson et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0089917 A1 | 3/2014 | Attalla et al. |
| 2014/0108672 A1 | 4/2014 | Ou et al. |
| 2014/0137111 A1 | 5/2014 | Dees et al. |
| 2014/0143320 A1 | 5/2014 | Sivasubramanian et al. |
| 2014/0149601 A1 | 5/2014 | Carney et al. |
| 2014/0164817 A1 | 6/2014 | Bartholomy et al. |
| 2014/0165061 A1 | 6/2014 | Greene et al. |
| 2014/0215019 A1 | 7/2014 | Ahrens |
| 2014/0257891 A1 | 9/2014 | Richardson et al. |
| 2014/0280679 A1 | 9/2014 | Dey et al. |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0006615 A1 | 1/2015 | Wainner et al. |
| 2015/0019686 A1 | 1/2015 | Backholm |
| 2015/0067171 A1 | 3/2015 | Yum |
| 2015/0081842 A1 | 3/2015 | Richardson et al. |
| 2015/0088972 A1 | 3/2015 | Brand et al. |
| 2015/0089621 A1 | 3/2015 | Khalid |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188734 A1 | 7/2015 | Petrov |
| 2015/0188994 A1 | 7/2015 | Marshall et al. |
| 2015/0189042 A1 | 7/2015 | Sun et al. |
| 2015/0195244 A1 | 7/2015 | Richardson et al. |
| 2015/0215270 A1 | 7/2015 | Sivasubramanian et al. |
| 2015/0215656 A1 | 7/2015 | Pulung et al. |
| 2015/0229710 A1 | 8/2015 | Sivasubramanian et al. |
| 2015/0244580 A1 | 8/2015 | Saavedra |
| 2015/0249579 A1 | 9/2015 | Ellsworth et al. |
| 2015/0256647 A1 | 9/2015 | Richardson et al. |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028644 A1 | 1/2016 | Richardson et al. |
| 2016/0028755 A1 | 1/2016 | Vasseur et al. |
| 2016/0036857 A1 | 2/2016 | Foxhoven et al. |
| 2016/0041910 A1 | 2/2016 | Richardson et al. |
| 2016/0065665 A1 | 3/2016 | Richardson et al. |
| 2016/0072720 A1 | 3/2016 | Richardson et al. |
| 2016/0134492 A1 | 5/2016 | Ellsworth et al. |
| 2016/0142367 A1 | 5/2016 | Richardson et al. |
| 2016/0182454 A1 | 6/2016 | Phonsa et al. |
| 2016/0182542 A1 | 6/2016 | Staniford |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0241651 A1 | 8/2016 | Sivasubramanian et al. |

(56) References Cited

U.S. PATENT DOCUMENTS

| | | | |
|---|---|---|---|
| 2016/0294678 | A1 | 10/2016 | Khakpour et al. |
| 2016/0308959 | A1 | 10/2016 | Richardson et al. |
| 2017/0041428 | A1 | 2/2017 | Katsev |
| 2017/0085495 | A1 | 3/2017 | Richardson et al. |
| 2017/0126557 | A1 | 5/2017 | Richardson et al. |
| 2017/0126796 | A1 | 5/2017 | Hollis et al. |
| 2017/0142062 | A1 | 5/2017 | Richardson et al. |
| 2017/0180217 | A1 | 6/2017 | Puchala et al. |
| 2017/0180267 | A1 | 6/2017 | Puchala et al. |
| 2017/0214755 | A1 | 7/2017 | Sivasubramanian et al. |
| 2017/0250821 | A1 | 8/2017 | Richardson et al. |
| 2017/0257340 | A1 | 9/2017 | Richardson et al. |

FOREIGN PATENT DOCUMENTS

| | | | |
|---|---|---|---|
| CN | 1511399 | A | 7/2004 |
| CN | 1605182 | A | 4/2005 |
| CN | 101189598 | A | 5/2008 |
| CN | 101460907 | A | 6/2009 |
| CN | 103731481 | A | 4/2014 |
| EP | 1603307 | A2 | 12/2005 |
| EP | 1351141 | A2 | 10/2007 |
| EP | 2008167 | A2 | 12/2008 |
| EP | 3156911 | A1 | 4/2017 |
| JP | 07-141305 | | 6/1995 |
| JP | 2001-0506093 | | 5/2001 |
| JP | 2001-249907 | | 9/2001 |
| JP | 2002-024192 | | 1/2002 |
| JP | 2002-044137 | | 2/2002 |
| JP | 2002-323986 | | 11/2002 |
| JP | 2003-167810 | A | 6/2003 |
| JP | 2003-167813 | A | 6/2003 |
| JP | 2003-522358 | A | 7/2003 |
| JP | 2003188901 | A | 7/2003 |
| JP | 2004-070935 | | 3/2004 |
| JP | 2004-532471 | | 10/2004 |
| JP | 2004-533738 | A | 11/2004 |
| JP | 2005-537687 | | 12/2005 |
| JP | 2007-133896 | A | 5/2007 |
| JP | 2007-207225 | A | 8/2007 |
| JP | 2008-515106 | | 5/2008 |
| JP | 2009-071538 | A | 4/2009 |
| JP | 2012-509623 | | 4/2012 |
| JP | 2012-209623 | | 10/2012 |
| WO | WO 2002/069608 | A2 | 9/2002 |
| WO | WO 2005/071560 | A1 | 8/2005 |
| WO | WO 2007/007960 | A1 | 1/2007 |
| WO | WO 2007/126837 | A2 | 11/2007 |
| WO | WO 2009124006 | A2 | 10/2009 |
| WO | WO 2010/002603 | A1 | 1/2010 |
| WO | WO 2012/044587 | | 4/2012 |
| WO | WO 2012065641 | A1 | 5/2012 |
| WO | WO 2017/106455 | A1 | 6/2017 |

OTHER PUBLICATIONS

Fifth Office Action in Chinese Application No. 200980111426.1 dated Aug. 14, 2015.
Kenshi, P., "Help File Library: Iptables Basics," Justlinux, retrieved Dec. 1, 2005, from http://www.justlinux.com/nhf/Security/Iptables_Basics.html, 4 pages.
Office Action in Japanese Application No. 2014-225580 dated Oct. 26, 2015.
Second Office Action in Chinese Application No. 201180046104.0 dated Sep. 29, 2015.
Office Action in Canadian Application No. 2816612 dated Nov. 3, 2015.
Sharif et al, "Secure In-VM Monitoring Using Hardware Virtualization", Microsoft, Oct. 2009 http://research.microsoft.com/pubs/153179/sim-ccs09.pdf; 11 pages.
Second Office Action in Chinese Application No. 201180053405.6 dated Dec. 4, 2015.
Office Action in European Application No. 07754164.7 dated Dec. 14, 2015.
Armour et al.: "A Heuristic Algorithm and Simulation Approach to Relative Location of Facilities"; Management Science, vol. 9, No. 2 (Jan. 1963); pp. 294-309.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Search Report for European Application No. 09839809.2 dated May 11, 2015.
Office Action in Japanese Application No. 2011-516466 dated May 30, 2016.
Office Action in Canadian Application No. 2884796 dated Apr. 28, 2016.
Office Action in Russian Application No. 2015114568 dated May 16, 2016.
Office Action in Chinese Application No. 201310537815.9 dated Jul. 5, 2016.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.

(56) References Cited

OTHER PUBLICATIONS

"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial. html; pp. 1-8.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. of Networking 2005, all pages.
Gunther et al, "Measuring Round Trip Times to determine the Distance between WLAN Nodes", Dec. 18, 2004, Technical University Berlin, all pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21(2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, I5 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.

(56) References Cited

OTHER PUBLICATIONS

Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Search Report and Written Opinion in Singapore Application No. 201103333-9 dated Nov. 19, 2012.
Examination Report in Singapore Application No. 201103333-9 dated Aug. 13, 2013.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
First Office Action in Chinese Application No. 201180053405.6 dated May 3, 2015.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 2 pages.
Office Action in Japanese Application No. 2011-502139 dated Aug. 17, 2015.
Third Office Action in Chinese Application No. 201180046104.0 dated Apr. 14, 2016.
Office Action in Japanese Application No. 2015-533132 dated Apr. 25, 2016.
Office Action in Japanese Application No. 2015-075644 dated Apr. 5, 2016 in 8 pages.
Office Action in Japanese Application No. 2014-225580 dated Oct. 3, 2016.
Partial Supplementary Search Report in European Application No. 09826977.2 dated Oct. 4, 2016.
Office Action in Chinese Application No. 201310717573.1 dated Jul. 29, 2016.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Office Action in European Application No. 09839809.2 dated Dec. 8, 2016.
Office Action in European Application No. 11767118.0 dated Feb. 3, 2017.
Decision of Rejection in Chinese Application No. 201180046104.0 dated Oct. 17, 2016.
Office Action in Canadian Application No. 2816612 dated Oct. 7, 2016.
Office Action in Canadian Application No. 2816612 dated Aug. 8, 2017.

(56) References Cited

OTHER PUBLICATIONS

Supplementary Examination Report in Singapore Application No. 11201501987U dated May 17, 2017.
Office Action in Chinese Application No. 201310537815.9 dated Jun. 2, 2017.
International Search Report and Written Opinion in PCT/US/2016/066848 dated May 1, 2017.

* cited by examiner

UPDATING ROUTING INFORMATION BASED ON CLIENT LOCATION

CROSS-REFERENCE TO RELATED APPLICATIONS

This application is a continuation of U.S. patent application Ser. No. 13/829,518, now U.S. Pat. No. 9,021,127, entitled "UPDATING ROUTING INFORMATION BASED ON CLIENT LOCATION" and filed Mar. 14, 2013, which in turn is a continuation of U.S. patent application Ser. No. 13/529,831, now U.S. Pat. No. 8,423,667, entitled "UPDATING ROUTING INFORMATION BASED ON CLIENT LOCATION" and filed Jun. 21, 2012, which in turn is a continuation application of U.S. patent application Ser. No. 13/165,484, now U.S. Pat. No. 8,234,403, entitled "UPDATING ROUTING INFORMATION BASED ON CLIENT LOCATION" and filed Jun. 21, 2011, which in turn is a continuation of U.S. patent application Ser. No. 12/272,683, now U.S. Pat. No. 7,991,910, entitled "UPDATING ROUTING INFORMATION BASED ON CLIENT LOCATION" and filed on Nov. 17, 2008, which in turn is related to U.S. application Ser. No. 11/771,679, filed on Jun. 29, 2007 and entitled "MAPPING ATTRIBUTES TO NETWORK ADDRESSES," the disclosures of which are herein incorporated by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to routing of a DNS query from a client computing device corresponding to content requests by a network resource, such as a content delivery network ("CDN") service provider. The processing of a DNS query by a CDN service provider is generally referred to as request routing. Specifically, aspects of the disclosure will be described with regard to the routing of a client computing device DNS query within a CDN service provider domain as a function of client location information associated with the client computing device. Other aspects of the disclosure are directed to collecting performance data associated with resolving the DNS query and updating routing information associated with client location information based on the performance data. Although various aspects of the disclosure will be described with regard to illustrative examples and embodiments, one skilled in the art will appreciate that the disclosed embodiments and examples should not be construed as limiting.

Figure 1:
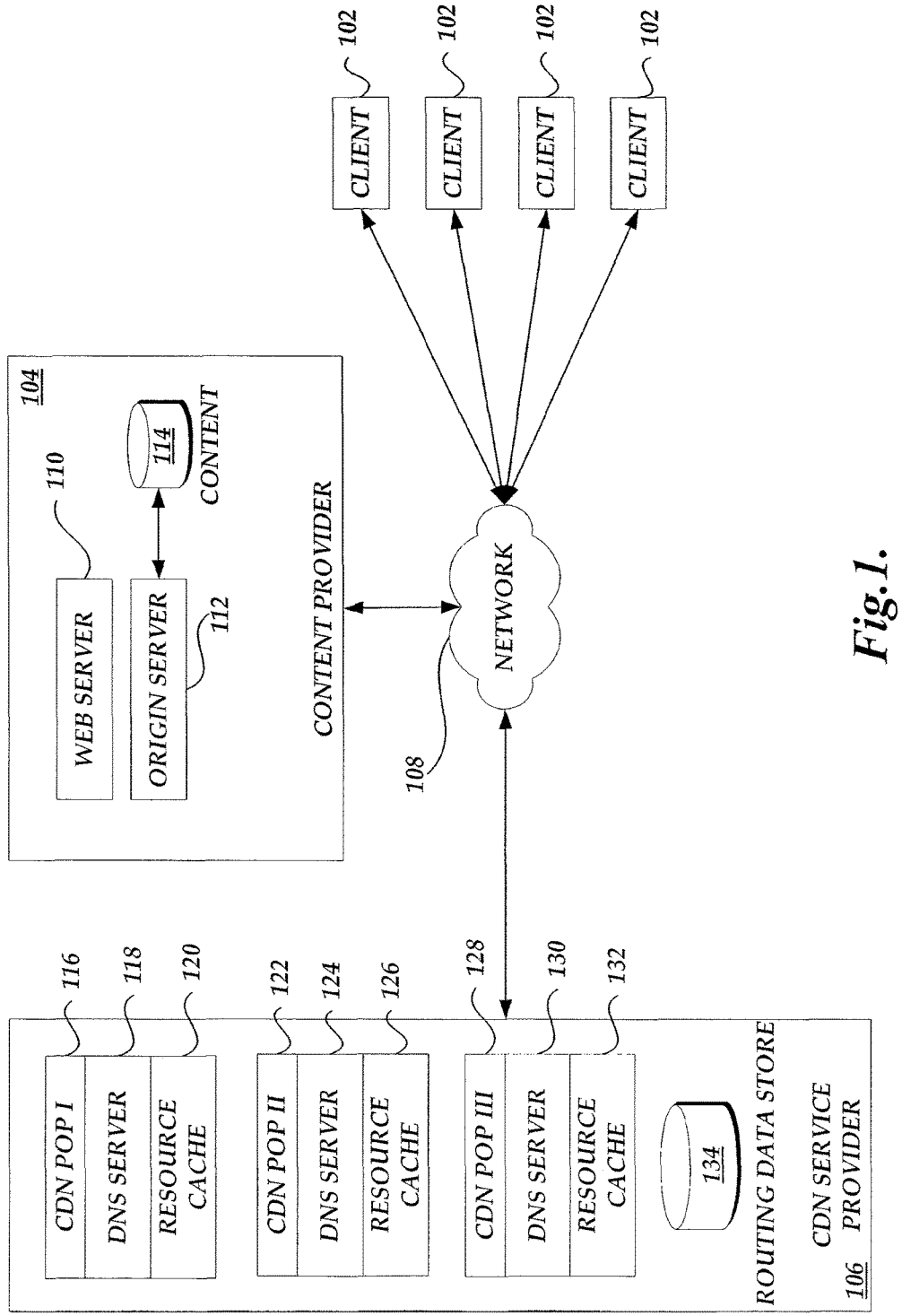
FIG. 1 is a block diagram illustrative of a content delivery environment including a number of client computing devices, a content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS name server, that generates the DNS queries attributed to the client computing device. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that are operative to receive DNS queries related to registered domain names associated with the content provider. The one or more DNS name servers can be authoritative to resolve client computing device DNS queries corresponding to the registered domain names of the content provider 104. A DNS name server component is considered to be authoritative to a DNS query if the DNS name server can resolve the query by providing a responsive IP address.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers.

Still further, the CDN service provider 106 includes a routing data store 134 for maintaining information regarding query IP address to location-based identifier mappings, as well as confidence factors associated with those mappings, such as disclosed in U.S. application Ser. No. 11/771,679, filed on Jun. 29, 2007 and entitled "Mapping Attributes to Network Addresses," which is herein incorporated by reference. In some embodiments, the location-based identifiers can correspond to locations directly determined based on physical locations or logical locations associated with the origin of the DNS query. In addition or alternatively, the location-based identifier can be inferred based on associating a relative location to known locations. For example, the location-based identifier can be attributed to known locations of POPs (corresponding to the CDN service provider) based on measured latency information associated with request routing between the client computing device or its local DNS resolver and these POPs. The measured latency information can be premeasured, such as through testing procedures or previously observed request routing behavior. Alternatively, the measured latency information can be dynamically measured in a real time basis or semi-real time basis.

The routing data store 134 can also maintain additional location mapping information such as mappings of the location-based identifiers to regional CDN destination identifiers. Even further, the location mapping data store 134 can include information identifying a set of POPs associated with each CDN destination identifier. Yet further, the routing data store 134 can include user profile information from which alternative user location information may be obtained. Yet still further, the routing data store 134 can include content provider routing criteria associated with a content provider identifier (or origin identifier), such as regional service plan information or other routing criteria, utilized by the CDN service provider 106 to route content requests. Yet even further, the routing data store 134 can also maintain performance data associated with processing resource requests.

In an illustrative embodiment, the routing data store 134 corresponds to a central data store accessible by the POPs 116, 122, 128, such as via a Web service. In another embodiment, each POP 116, 122, 128 can maintain a local version of a routing data store 134 for utilization in request routing as will be explained in greater detail. Additionally, although the routing data store 134 is illustrated as a single data store, one skilled in the relevant art will appreciate that routing data store 134 may correspond to one or more data stores and may be implemented in a distributed manner.

The DNS components 118, 124 and 130 and the resource cache components 120, 126 and 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
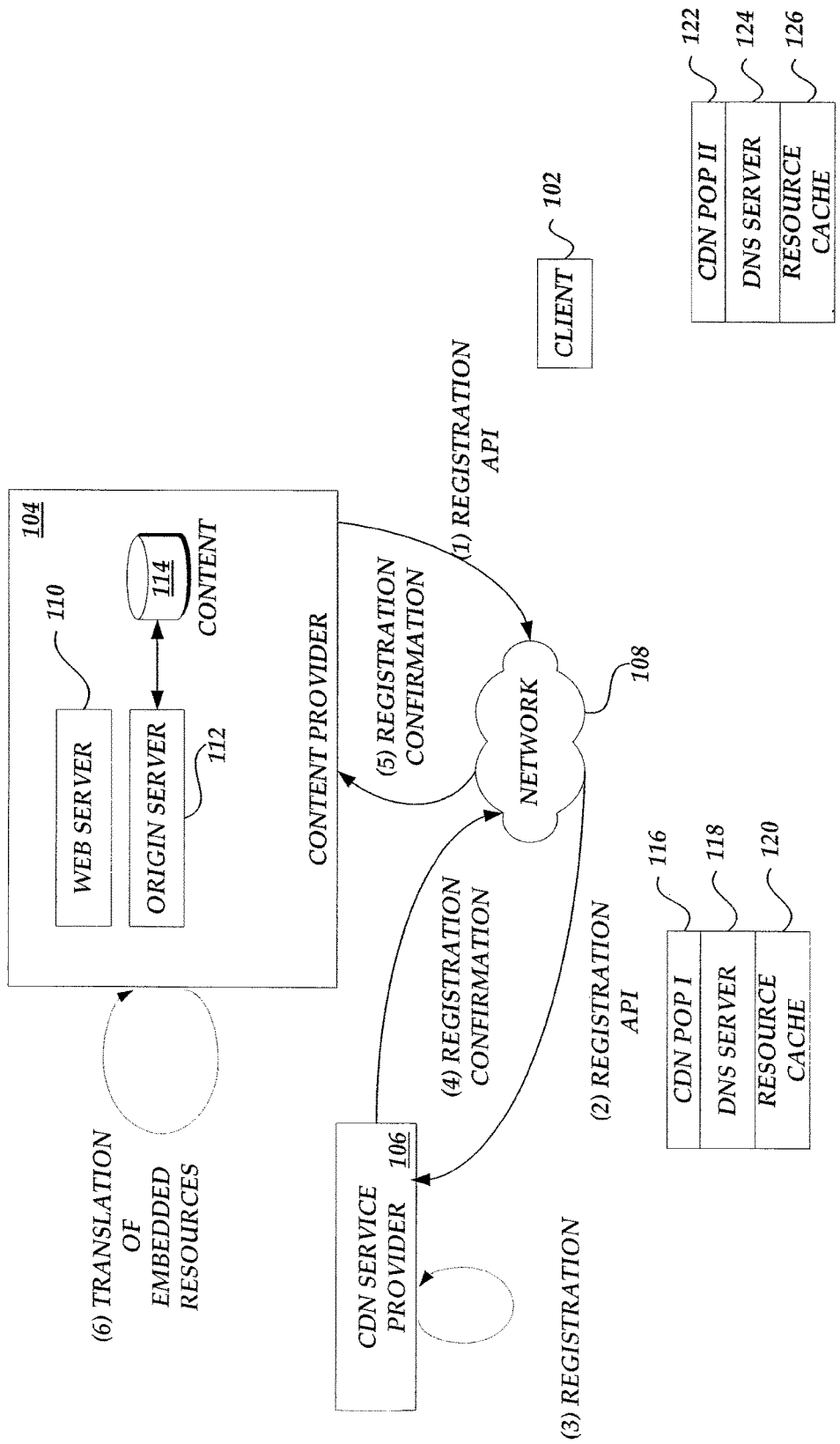
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106. Additionally, as will be explained in greater detail below, the content provider 104 can also provide additional information, such as regional service plan information or other routing criteria, utilized by the CDN service provider 106 to route content requests. In one embodiment, the routing criteria can include the specification of a particular regional service plan, which may limit the regions from which content requests may be resolved by the CDN service provider 106. In another embodiment, the routing criteria can include a selection by the content provider 104 that the CDN service provider 106 should attempt to service specific resource requests from a particular regional destination or POP or from a particular distribution of regional destinations or POPs.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, content provider identifiers, such as content provider identification codes or origin server identifiers, executable code for processing resource identifiers, such as script-based instructions, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). Specifically, as set forth above, in one illustrative embodiment, the additional information can include a content provider identifier. Additionally, the translated URL can include any additional information utilized by the CDN service provider during the request routing, including, but not limited to, service plan information, file identifiers, and the like. Such information may be included in the modified URL or may be omitted from the translated URL and obtained by the CDN service provider 106 during the request routing process, such as by a lookup according to a content provider identifier. The translated URL would have the form of:

http://additional_information.cdnprovider.com/path/resource.xxx

Figure 3:
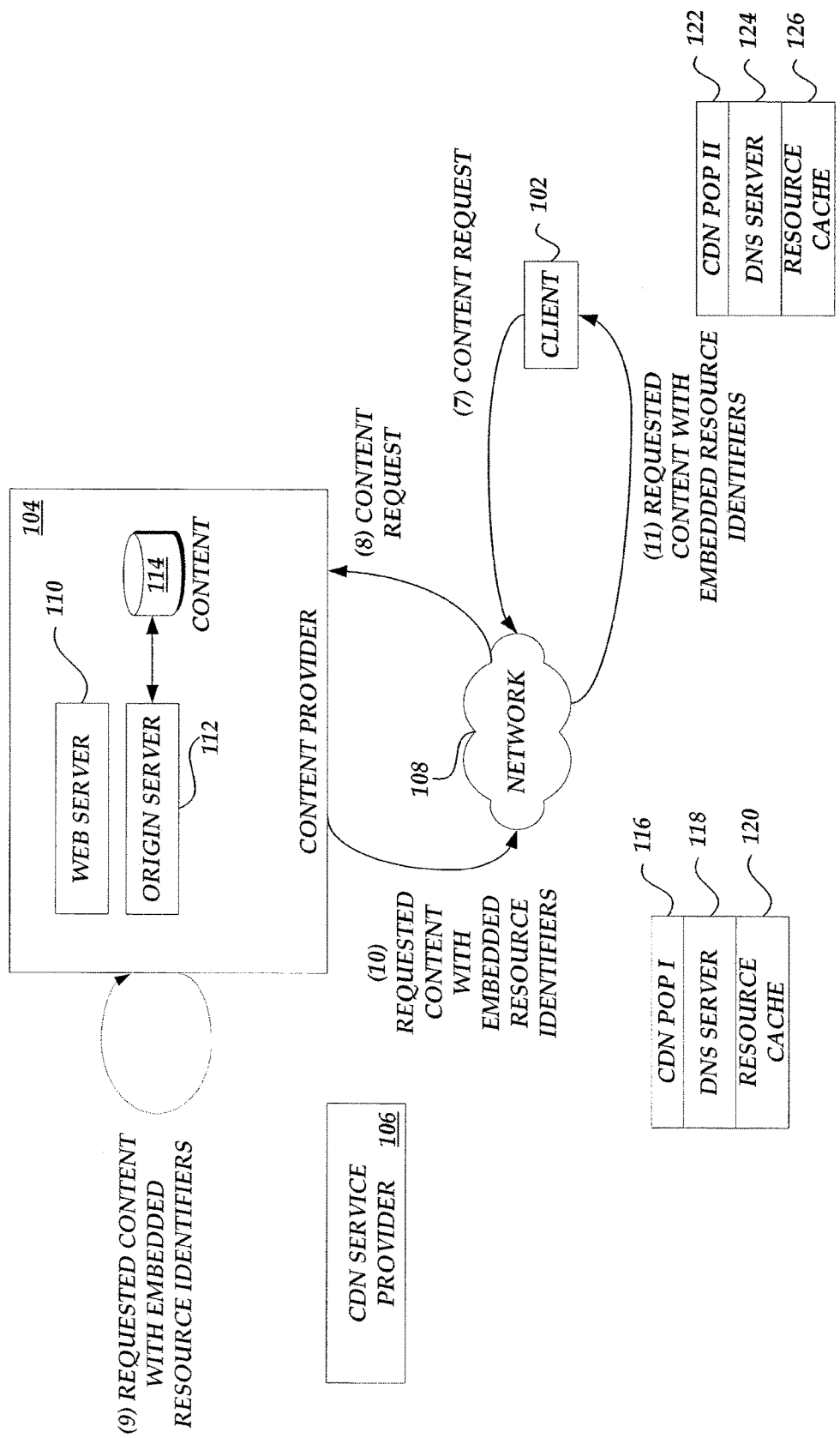
FIG. 3 is a block diagram of the content delivery environment of FIG. 1 illustrating the generation and processing of a content request from a client computing device to a content provider.

In another embodiment, the information associated with the CDN service provider 106 is included in the modified URL, such as through prepending or other techniques, such that the translated URL can maintain all of the information associated with the original URL. In this embodiment, the translated URL would have the form of:

http://additional_information.cdnprovider.com/www-.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the original URL resource identifier that results in the identification of a DNS server authoritative to the "." and the "com" portions of the translated URL. After processing the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

Figure 4A:
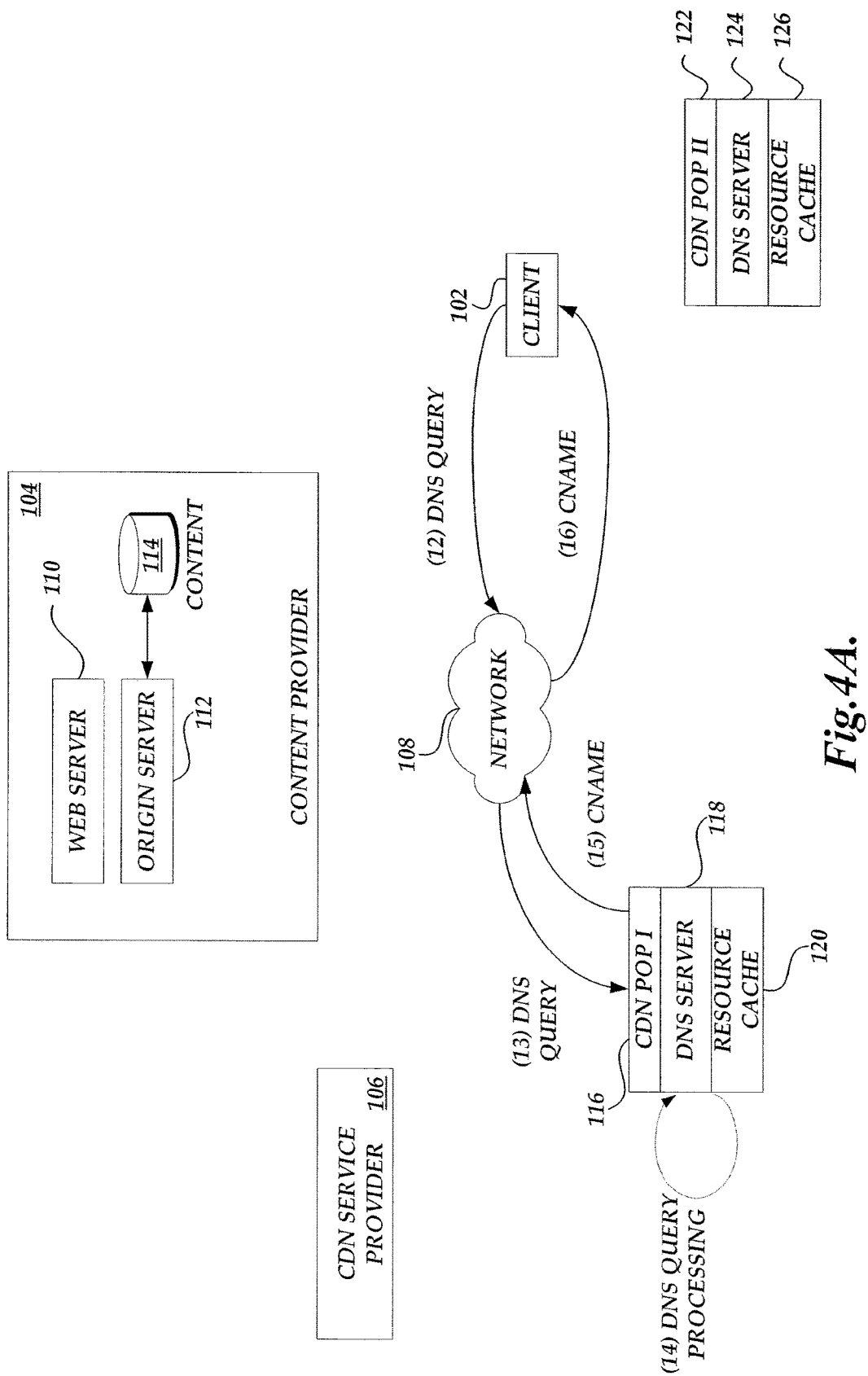
FIGS. 4A-4B are block diagrams of the content delivery environment of FIG. 1 illustrating one embodiment of the generation and processing of a DNS query corresponding to an embedded resource from a client computing device to a content delivery network service provider and the subsequent generation and processing of DNS queries corresponding to a first alternative resource identifier from a client computing device to a content delivery network.

With reference now to FIG. 4A, in an illustrative embodiment, the successful resolution of the "cdnprovider" portion of the original URL identifies a network address, such as an IP address, of a DNS server associated with the CDN service provider 106. In one embodiment, the IP address can be a specific network address unique to a DNS server component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4A, in either of the above identified embodiments (or any other embodiment), a specific DNS server in the DNS component 118 of a POP 116 receives the DNS query corresponding to the original URL from the client computing device 102. Once one of the DNS servers in the DNS component 118 receives the request, the specific DNS server attempts to resolve the request. In one illustrative embodiment, as shown in reference to FIG. 5, a specific DNS server resolves the DNS query by identifying an IP address of a cache server component that will process the request for the requested resource. As described above and as will be described further below in reference to FIG. 6, a selected resource cache component can process the request by either providing the requested resource if it is available or attempt to obtain the requested resource from another source, such as a peer cache server computing device or the origin server 112 of the content provider 104.

Figure 5:
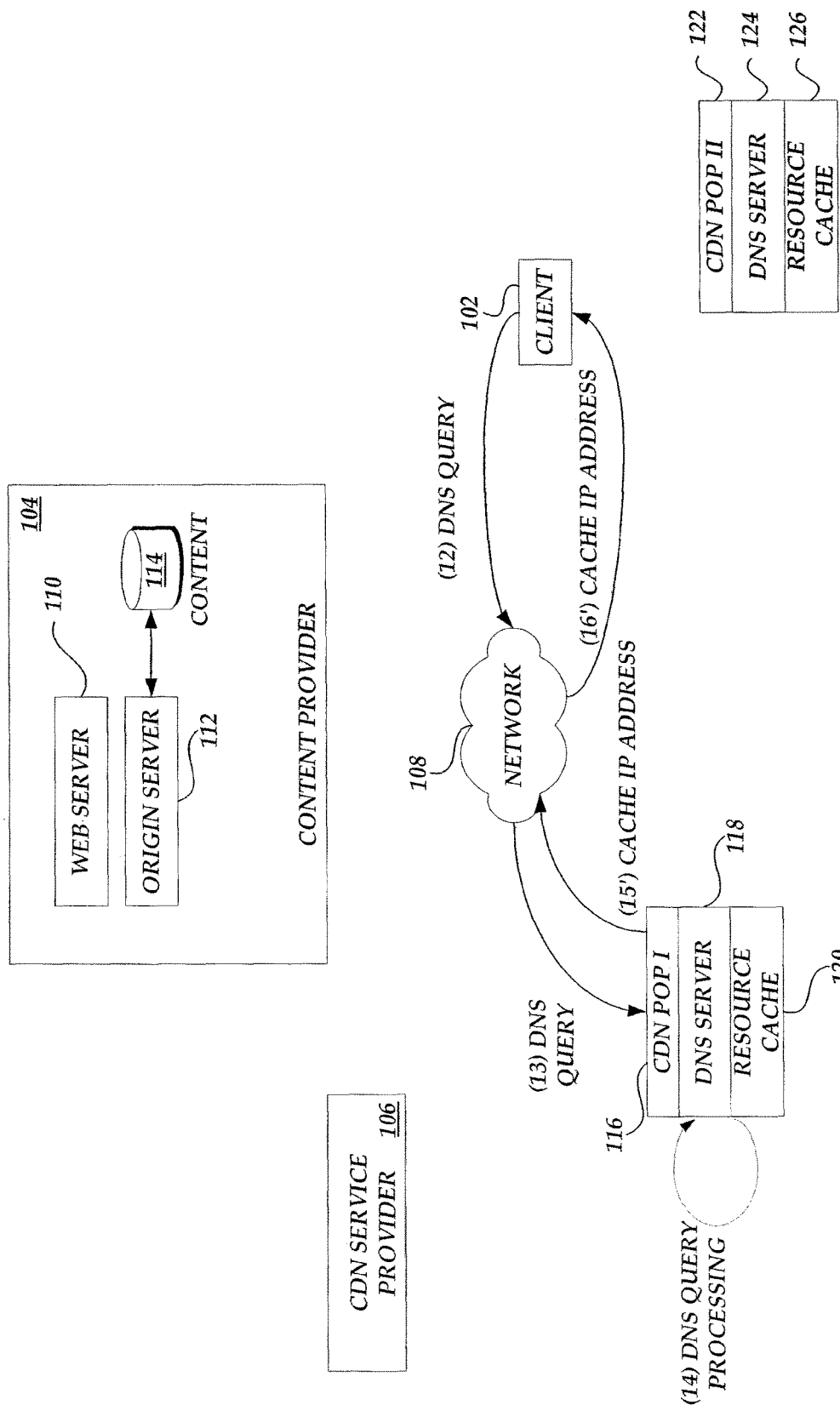
FIG. 5 is a block diagram of the content delivery environment of FIG. 1 illustrating another embodiment of the generation and processing of a DNS query corresponding to an embedded resource from a client computing device to a content delivery network service provider.

Returning to FIG. 4A, as an alternative to selecting a resource cache component upon receipt of a DNS query as described in reference to FIG. 5, the CDN service provider 106 can maintain sets of various alternative resource identifiers. The alternative resource identifiers can be provided by the CDN service provider 106 to the client computing device 102 such that a subsequent DNS query on the alternative resource identifier will be processed by a different DNS server component within the CDN service provider's network. In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record.

Additionally, each CNAME record includes additional information, such as request routing information, (e.g., "request routing information"). An illustrative CNAME record can have the form of:

http://request_routing_information.cdnprovider.com/
        path/resource.xxx
    CNAME request_routing_information.cdnprovider.com In an illustrative embodiment, the CNAME records are generated and provided by the DNS servers to identify a more appropriate DNS server of the CDN service provider 106. As used in accordance with the present disclosure, appropriateness can be defined in any manner by the CDN service provider 106 for a variety of purposes. In an illustrative embodiment, as will be described in greater detail below in reference to FIGS. 7 and 8, the CDN service provider 106 will utilize client location information associated with the client computing device 102 or its local DNS resolver, at least in part, to identify the more appropriate DNS server of the CDN service provider 106. In particular, the CDN service provider 106 can utilize an IP address associated with a client computing device DNS query to identify a corresponding location-based identifier representing a possible location of the client computing device. The CDN service provider 106 can then, in turn, utilize the location-based identifier to identify a destination identifier representing a geographic region associated with the CDN service provider 106 from which the resource request should be resolved. Based on the destination identifier, the CDN service provider 106 can then select a POP 116, 122, 128 from a set of POPs that are capable of servicing resource requests for the destination corresponding to the destination identifier. In one example, if more than one POP is identified in the set, the CDN service provider 106 can utilize a distribution allocation for selecting a specific POP associated with the identified destination. In another example, once a POP is selected, the CDN service provider 106 can further use health information to determine whether the selected POP is available to service requests before providing the client computing device with a CNAME corresponding to the selected POP. One skilled in the art will appreciate that the above functionality is illustrative in nature and accordingly should not be construed as limiting.

As described above, in addition to considering client location information (either of the end-client or its associated local DNS resolver component), the CDN service provider 106 can utilize the additional information (e.g., the "additional information") included in the translated URL to select a more appropriate DNS server. In one aspect, the CDN service provider 106 can utilize the additional information to select from a set of DNS servers identified as satisfying criteria associated with the client location information. In another aspect, the CDN service provider 106 can utilize the additional information to validate the DNS server selected in accordance with the client location information or to select an alternative DNS server previously selected in accordance with the client location information. In one example, the CDN service provider 106 can attempt to direct a DNS query to DNS servers according to additional geographic criteria. The additional geographic criteria can correspond to geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS server in a region corresponding to the content provider's regional plan.

In another example, the CDN service provider 106 can attempt to direct a DNS query to DNS servers according to service level criteria. The service level criteria can correspond to service or performance metrics contracted between the CDN service provider 106 and the content provider 104. Examples of performance metrics can include latencies of data transmission between the CDN service provider POPs and the client computing devices 102, total data provided on behalf of the content provider 104 by the CDN service provider POPs, error rates for data transmissions, and the like.

In still a further example, the CDN service provider 106 can attempt to direct a DNS query to DNS servers according to network performance criteria. The network performance criteria can correspond to measurements of network performance for transmitting data from the CDN service provider POPs to the client computing device 102. Examples of network performance metrics can include network data transfer latencies (measured by the client computing device or the CDN service provider 106, network data error rates, and the like.

In accordance with an illustrative embodiment, the DNS server maintains a data store that defines CNAME records for various original URLs. If a DNS query corresponding to a particular original URL matches an entry in the data store, the DNS server returns a CNAME record as defined in the data store. In an illustrative embodiment, the data store can include multiple CNAME records corresponding to a particular original URL. The multiple CNAME records would define a set of potential candidates that can be returned to the client computing device. In such an embodiment, the DNS server, either directly or via a network-based service, can implement additional logic in selecting an appropriate CNAME from a set of possible of CNAMEs. In an illustrative embodiment, each DNS server component 118, 124, 130 maintains the same data stores that define CNAME records, which can be managed centrally by the CDN service provider 106. Alternatively, each DNS server component 118, 124, 130 can have POP specific data stores that define CNAME records, which can be managed centrally by the CDN service provider 106 or locally at the POP 116, 122, 128. Still further, each DNS server computing device within the DNS server components 118, 124, 130 can utilize shared data stores managed by a respective POP or a local data store specific to an individual DNS server computing device.

The returned CNAME can also include request routing information that is different from or in addition to the information provided in the URL/CNAME of the current DNS query. For example, a specific regional plan can be identified in the "request_routing_information" portion of the specific CNAME record. A similar approach could be taken to identify service level plans and file management by including a specific identifier in the "request_routing_information" portion of the CNAME record. In another embodiment, request routing information can be found in the identification of a CDN service provider 106 domain different from the domain found in the current URL/CNAME. For example, a specific regional plan domain (e.g., "cdn-provider-region1.com") could be used in the domain name portion of the specific CNAME record. Any additional request routing information can be prepended to the existing request routing information in the current URL/CNAME such that the previous request routing information would not be lost (e.g., serviceplan.regionalplan.cdnprovider.com). One skilled in the relevant art will appreciate that additional or alternative techniques and/or combination of techniques may be used to include the additional request routing information in the CNAME record that is selected by the DNS server component 118.

With continued reference to FIG. 4A, one skilled in the relevant art will appreciate that the DNS server may select (or otherwise obtain) a CNAME record that is intended to resolve to a more appropriate DNS server of the CDN service provider 106. It may be possible, however, that the same DNS server would also be authoritative for the subsequent DNS query for the CNAME to be provided to the client computing device. For example, a specific DNS server may be authoritative for both a particular geographic location associated with the client computing device and a specific regional plan identified by a content provider plan. Thus, returning a CNAME would still result in the DNS query arriving at the same DNS server (which may also be due in part to the client computing device's geography). In such an embodiment, the DNS server, such as DNS server component 118, may choose to resolve the future DNS query in advance.

Figure 4B:
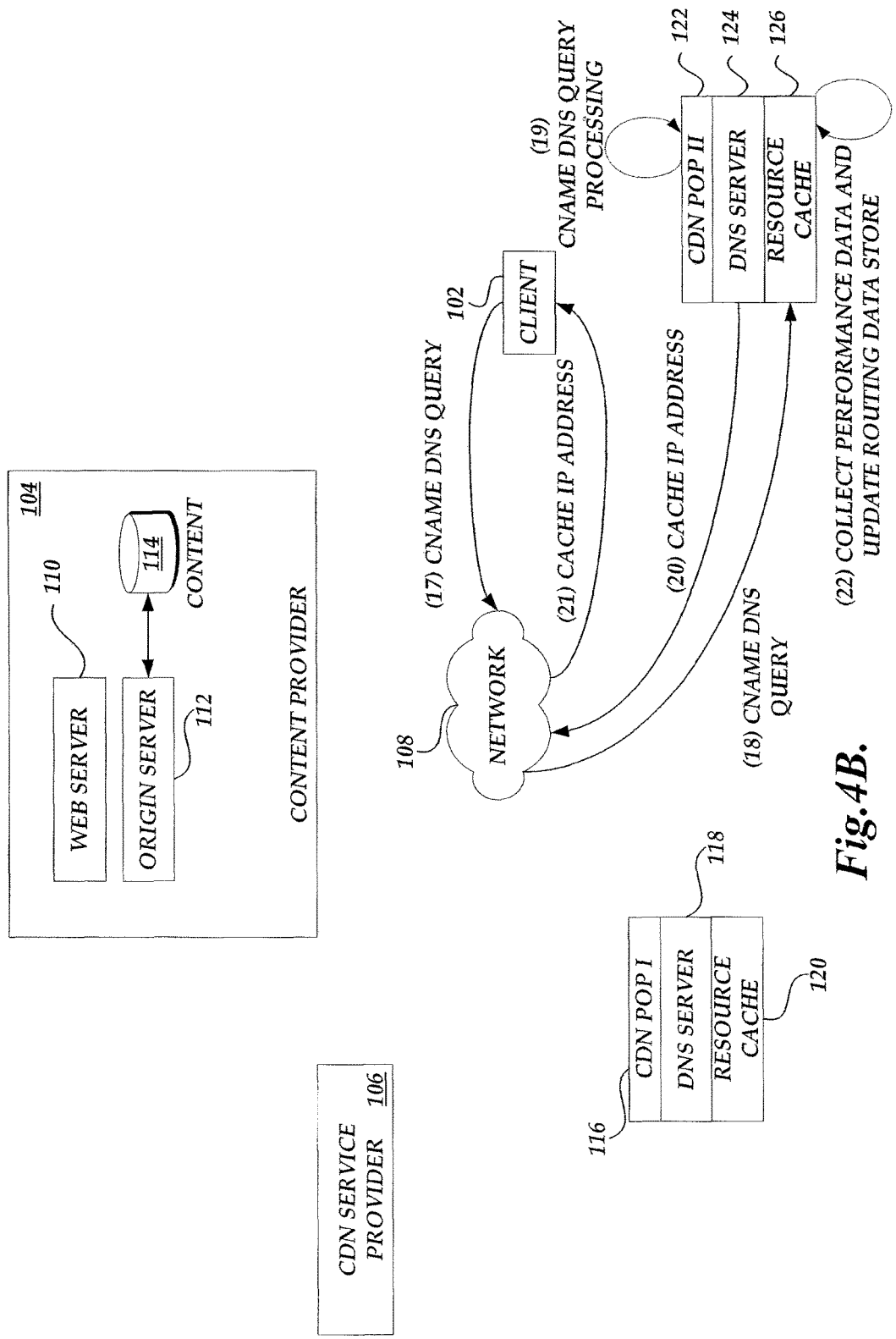

With reference now to FIG. 4B, upon receipt of the CNAME from the DNS server component 118, the client computing device 102 generates a subsequent DNS query corresponding to the CNAME. As previously discussed with regard to FIG. 4A, the DNS query process could first start with DNS queries for the "." and "com" portions, followed by a query for the "cdnprovider" portion of the CNAME. To the extent, however, that the results of a previous DNS queries can be cached (and remain valid), the client computing device 102 can utilize the cached information and does not need to repeat the entire process. However, at some point, depending on whether the CNAME provided by DNS server component 118 (FIG. 4A) and the previous URL/CNAME share common CDN service provider domains, the current CNAME DNS query will be processed by a different POP provided by the CDN service provider 106. As illustrated in FIG. 4B, the DNS server component 124 of POP 122 receives the current CNAME based on the different information in the current CNAME previously provided by the DNS server component 118. As previously described, the DNS server component 124 can then determine whether to resolve the DNS query on the CNAME with an IP address of a cache component that will process the content request or whether to provide another alternative resource identifier selected in the manners described above.

For purposes of illustration, assume that the DNS server component 124 processes the content request by returning an IP address of a resource cache component. In an illustrative embodiment, the DNS server component 124 can utilize a variety of information in selecting a resource cache component. In one example, the DNS server component 124 can default to a selection of a resource cache component of the same POP. In another example, the DNS server components can select a resource cache component based on various load balancing or load sharing algorithms. Still further, the DNS server components can utilize network performance metrics or measurements to assign specific resource cache components. The IP address selected by a DNS server component may correspond to a specific caching server in the resource cache. Alternatively, the IP address can correspond to a hardware/software selection component (such as a load balancer).

With continued reference to FIG. 4B, the CDN service provider 106 collects performance data associated with resolving the content request and utilizes the performance data to determine whether any updates to the routing information should be made. The CDN service provider 106 can collect performance data at any time during the process or after resolution of the content request. Such performance data can include measurements of network performance for transmitting data from the CDN service provider POPs to the client computing device 102. In one embodiment, network data transfer latencies associated with the delivery of the requested resource are measured by the client computing device 102. Alternatively, the CDN service provider 106, such as through the resource cache component, can measure the performance as part of providing content to a client computing device. Such network performance data can be managed and maintained globally by the CDN service provider and shared with the DNS servers of the CDN or individually by the DNS servers of the CDN service provider. Moreover, network performance criteria can be provided as a batch process from POPs or sent in response to a request from one POP to another.

Additionally, while performance data can be collected relative to an end-client's experience in one embodiment, this data collection can be independent of how a client request is routed. For example, the routing choice for a client request can be based on an IP address associated with the client's DNS resolver, but the performance data associated with resolving that request may be based on the experience of the end-client device.

Based on the collected performance data, the CDN service provider can then determine whether an update to routing information associated with client location information is needed. Updates to routing information can be implemented in a number of ways, such as by modifying and/or deleting existing routing information, adding new routing information, and the like. In one embodiment, the update determination can be made by the CDN service provider globally or by the individual DNS service components or DNS servers. In an illustrative embodiment where individual DNS servers determine whether to update routing information, each DNS server can manage and maintain routing information unique to the particular DNS server. In this illustrative embodiment, the performance data can be maintained globally by the CDN service provider and shared with the DNS components and/or DNS servers, with each DNS component and/or DNS server managing how the performance data is used. Accordingly, routing information may vary from one DNS component/server to another.

Figure 6:
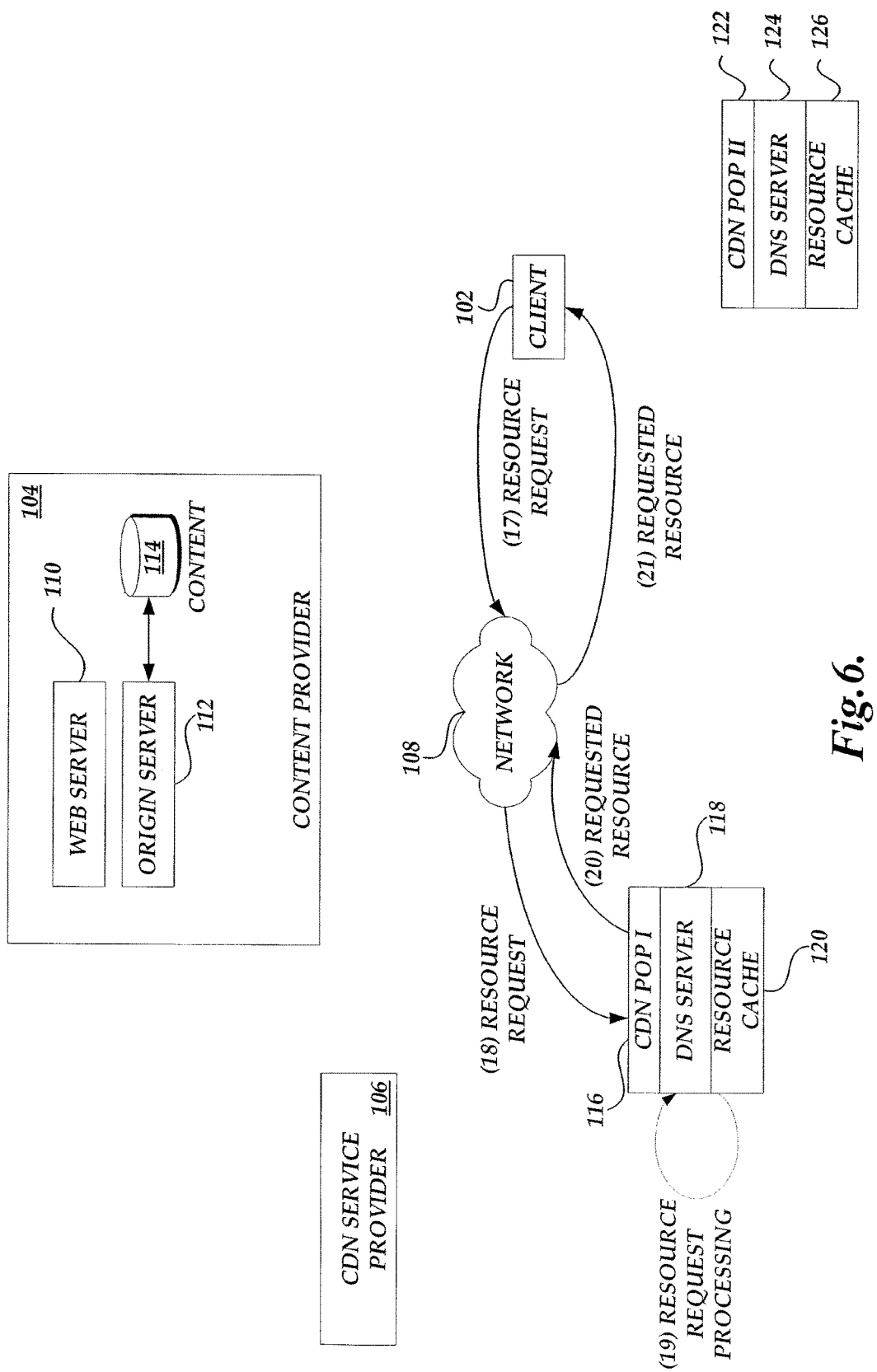
FIG. 6 is a block diagram of the content delivery environment of FIG. 1 illustrating the generation and processing of embedded resource requests from a client computing device to a content delivery network service provider.

With reference now to FIG. 6, in an illustrative example, assume that the DNS server component 124 has selected the resource cache component 126 of POP 122. Upon receipt of the IP address for the resource cache component 126, the client computing device 102 transmits a request for the requested content to the resource cache component 126. The resource cache component 126 processes the request in a manner described above and the requested content is transmitted to the client computing device 102.

Figure 7:
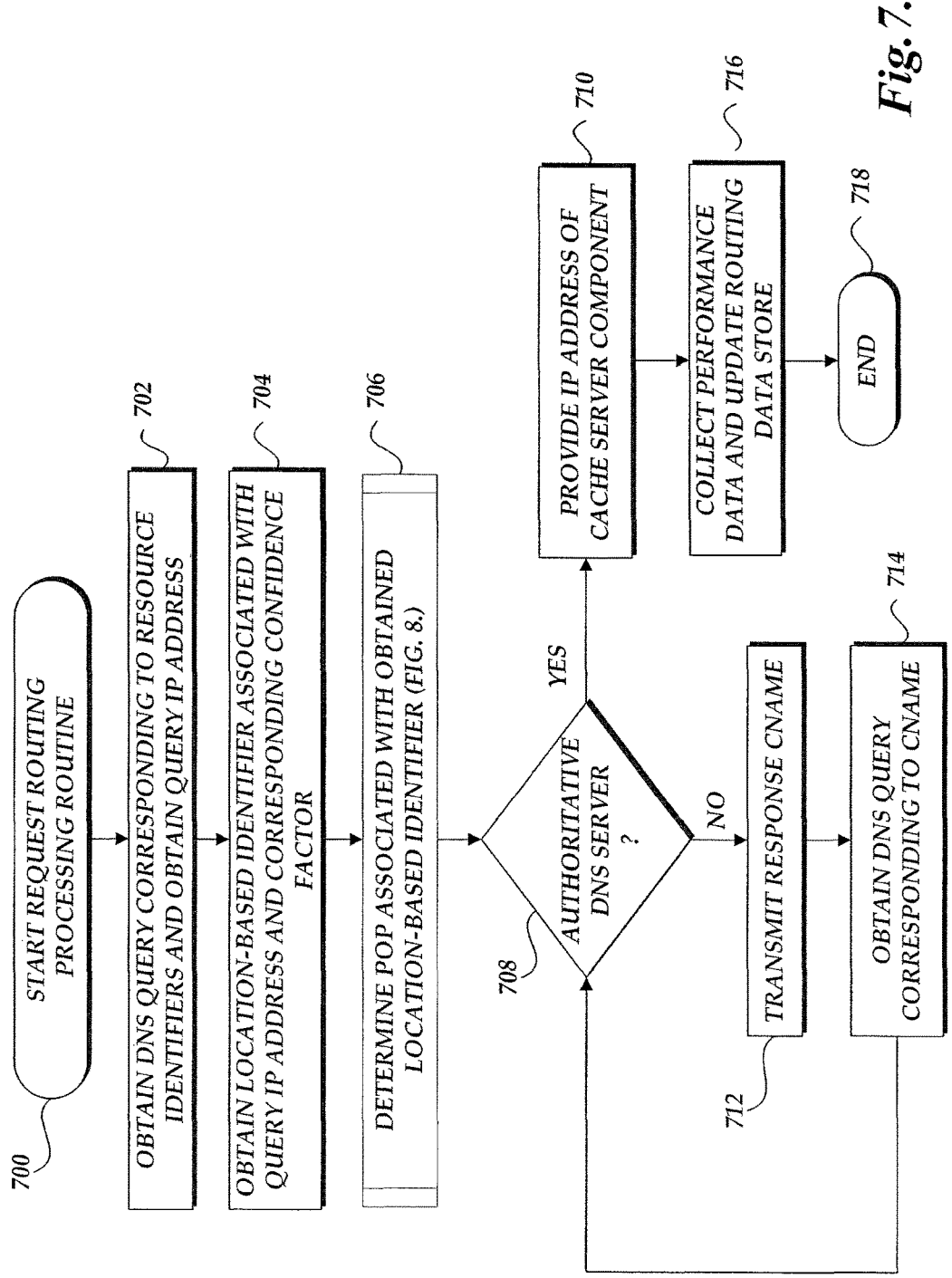
FIG. 7 is a flow diagram illustrative of a request routing routine implemented by a content delivery network service provider for selecting a DNS server for resolving a resource request and for processing performance data associated with the selected request routing.

With reference now to FIG. 7, one embodiment of a request routine 700 implemented by the CDN service provider 106 for processing a resource request, as well as performance data associated with resolving the resource request, will be described. One skilled in the relevant art will appreciate that actions/steps outlined for routine 700 may be implemented by one or many computing devices/components that are associated with the CDN service provider 106. Accordingly, routine 700 has been logically associated as being generally performed by the CDN service provider 106, and thus the following illustrative embodiments should not be construed as limiting.

At block 702, one of the DNS server components 118, 124, 130 receives a DNS query corresponding to a resource identifier. As previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. The receiving DNS server also obtains an IP address associated with the DNS query from the requesting client computing device 102 ("query IP address") at block 702. The query IP address can correspond to an IP address of the client computing device or any local DNS resolver component associated with the client computing device.

Next, at block 704, the receiving DNS server obtains a location-based identifier associated with the query IP address. Each DNS server maintains (or otherwise has access to) a data store 134 mapping a set of location-based identifiers with at least portions of known IP addresses (e.g., mapping a specific location-based identifier with a specific IP address or specific partial IP address). Utilizing the data store 134, the receiving DNS server attempts to match the IP address associated with the client computing device 102 DNS query (as transmitted via the local DNS resolver component) with the IP addresses in the data store 134. If the query IP address can be partially matched to an IP address in the data store 134, the DNS server identifies a corresponding location-based identifier. In this way, query IP addresses that the receiving DNS server has not previously evaluated can be routed based on existing data, and as will be described further below, updates can subsequently be made to the routing information based on performance data related to the query. For example, the receiving DNS server can determine that a query IP address (e.g., 128.1.3.12) that falls in a particular group of IP addresses (e.g., 128.1.x.x) will be treated the same until the CDN service provider 106 determines that the query IP address should be treated differently.

As similarly set forth above, the location-based identifiers can correspond to locations directly determined based on physical locations or logical locations associated with the origin of the DNS query. Additionally, the location-based identifier can be inferred based on associating a relative location to known locations. For example, the location-based identifier can be attributed to known locations of POPs (corresponding to the CDN service provider) based on measured latency information associated with request routing between the client computing device or its local DNS resolver and these POPs. The measured latency information can be premeasured, such as through testing procedures or previously observed request routing behavior. Alternatively, the measured latency information can be dynamically measured in a real time basis or semi-real time basis.

In an illustrative embodiment, the DNS server also optionally obtains a confidence factor associated with the location-based identifier from the data store 134 at block 704. The confidence factor corresponds to a degree of confidence in the accuracy of the associated location-based identifier to the query IP address. The optional confidence factor will be further discussed in reference to FIG. 8.

Figure 8:
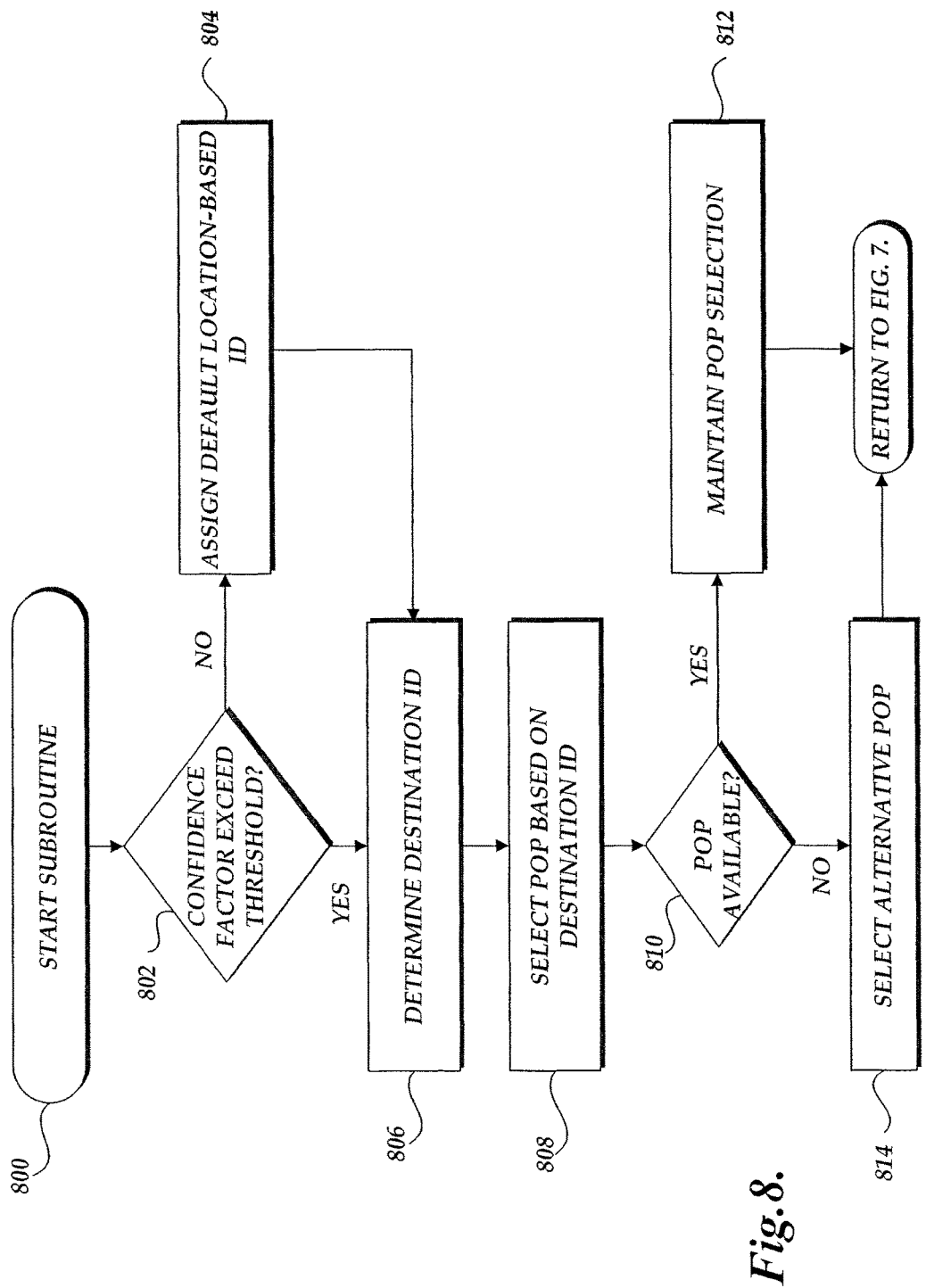
FIG. 8 is a flow diagram illustrative of a request routing subroutine implemented by a content delivery network service provider in the illustrative flow diagram of FIG. 7 for determining a network point of presence for servicing a resource request based on an obtained location-based identifier.

Next, at a block 706, the receiving DNS server determines a POP from a set of one or more POPs associated with the obtained location-based identifier for resolving the resource request. Generally, the set of one or more POPs are capable of servicing resource requests from a region associated with the identified location of the requesting client computing device 102. As will be described further below, FIG. 8 illustrates one embodiment of a request routing subroutine for performing the functionality associated with block 706.

At decision block 708, a test is conducted to determine whether the current DNS server is authoritative to resolve the DNS query. In one illustrative embodiment, the DNS server can determine whether it is authoritative to resolve the DNS query if the determined POP for resolving the resource request corresponds to the same POP associated with the receiving DNS server. If the determined POP indeed corresponds to the same POP associated with the receiving DNS server, then the receiving DNS server is considered to be authoritative, and the receiving DNS server identifies a cache server associated with the resource cache component from the same POP to process a subsequent client resource request (e.g., a request for the embedded resource) at block 710. The receiving DNS server resolves the DNS query by returning the IP address of, for example, a default or specific cache server or a load balancing component (as appropriate) associated with the resource cache component from the same POP. A number of methodologies for selecting an appropriate resource cache component at the POP may be implemented.

Alternatively, if at decision block 708 the determined POP corresponds to another POP of the CDN service provider 106, and hence the receiving DNS server is not authoritative, the receiving DNS server selects and transmits an alternative resource identifier at block 712. Specifically, in one embodiment, the receiving DNS server identifies an appropriate CNAME corresponding to the selected POP and transmits the CNAME to the client computing device 102. At block 714, different DNS server components 118, 124, 130 then receive a DNS query from the client computing device 102 corresponding to the CNAME. The routine 700 then returns to decision block 708 and continues to repeat as appropriate.

Alternative or additional methodologies may also be practiced to determine whether the DNS server is authoritative. In one embodiment, the receiving DNS server may maintain one or more CNAMEs that define various alternatives for request routing processing based on geographic regions of the CDN service provider 106. In this embodiment, instead of determining a POP associated with the obtained location-based identifier at block 706, the receiving DNS server can determine a destination identifier associated with the obtained location of the client computing device, as will be similarly discussed below in reference to FIG. 8 at block 806. The DNS server in this alternative embodiment can then select an appropriate CNAME of an alternative POP based on the determined destination identifier alone or in combination with other request routing criteria.

Next, at a block 716, the CDN service provider 106 collects performance data associated with resolving the content request and utilizes the performance data to determine whether any updates to routing information associated with client location information should be made. As mentioned above, the CDN service provider 106 can collect performance data at any time during the above process or after resolution of the content request. The CDN service provider 106 can then process the collected performance data at block 716 to determine whether any updates to the routing data store 134 should be made. As will be further described below, routing updates associated with client location information include, for example, updates to query IP address to location-based identifier mappings, location-based identifier to destination identifier mappings, POP distribution allocations, failover list entries and distribution allocations, and the like.

In one illustrative embodiment, the CDN service provider 106 can collect performance data to determine whether any modifications should be made to the query IP address to location-based identifier mappings in the routing data store 134. For example, if a first resource request associated with a particular location-based identifier results in poor routing performance, yet other resource requests from the same location result in good routing performance, the CDN service provider may determine that the location-based identifier associated with the first resource request is inaccurate. In this example, the CDN service provider 106 may utilize client profile data associated with the requesting client computing device to determine an alternative location to map to the query IP address. For example, the CDN service provider 106 may refer to a client's user profile data in the routing data store 134 to determine an alternate billing address or a shipping address for the client. The CDN service provider 106 can use this newly identified location to designate a new location-based identifier associated with the query IP address. Specifically, in one embodiment, the CDN service provider 106 can add a new entry to the routing data store 134 mapping the query IP address to the new location-based identifier. Alternatively, in another embodiment, the CDN service provider 106 can modify the existing location-based identifier to at least partial IP address mapping entry, which is associated with the query IP address, by replacing the existing location-based identifier with the new location-based identifier. In a specific illustrative embodiment, the CDN service provider 106 can use the performance data to determine to collapse two or more location-based identifier to at least partial IP address mapping entries into a new single mapping entry. In addition or alternatively, the CDN service provider 106 can use the performance data to separate a current mapping entry into two or more mapping entries.

In another embodiment, if all resource requests associated with a particular location-based identifier result in poor routing performance, the CDN service provider 106 may determine that the query IP address to location-based identifier mappings are accurate, but the associated destination identifiers (as will be further described in reference to FIG. 8 at block 806) or the associated POPs (or corresponding CNAMEs) need modification. In this example, the CDN service provider may modify the location-based identifier to destination identifier mappings or the available POP selections associated with the location and/or destination identifiers.

In yet another illustrative embodiment, a probability of selecting each POP (or corresponding CNAME) in a set (such as at block 706 or, as further described below, at block 808) can be initially defined in a number of ways, and the receiving DNS server selects a POP/CNAME based on the defined probabilities. For example, a set of POPs may be identified as corresponding to a particular destination identifier as will be further described below in reference to FIG. 8. The selection of a particular POP from the set can be based on a distribution allocation. For example, the CDN service provider 106 may provide three POPs, such as Seattle, San Francisco, and Los Angeles POPs, in a West Coast Region of the United States. In this example, a distribution allocation may provide that the Seattle POP be used 60% of the time, while the San Francisco and Los Angeles POPs are each used 20% of the time. Accordingly, in this illustrative embodiment, a DNS server will most frequently select the POP/CNAME with the highest probability of selection, but can also, at times based on the corresponding probabilities, select a CNAME with a lower probability of selection. In this case, the probabilities correspond to anticipated performance of the corresponding computing device. The CDN service provider 106 can monitor performance of delivering requested resources to these POPs and thereafter update the probabilities. In further embodiments, the probabilities can correspond to load shedding or other network traffic mitigation. Moreover, in other embodiments, some of the POPs located in a particular region may be omitted from the initial distribution allocation, and instead may be identified in a failover list and used if one of the originally selected POPs is unavailable. The failover list may also have a distribution allocation assigned to a set of POPs in the list, which can also be updated based on performance data.

With reference now to FIG. 8, one embodiment of a request routing subroutine 800 for selecting a POP associated with the location of the requesting client computing device will be described. One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At decision block 802, where the receiving DNS server of the CDN service provider 106 has obtained a confidence factor associated with the location-based identifier (from block 704 of FIG. 7), a test is performed to determine whether the confidence factor exceeds a minimum threshold value. If the confidence factor does not exceed a minimum threshold, the DNS server assigns a default location-based identifier at block 804. In one embodiment, the default location-based identifier may correspond to the location of the receiving DNS server. If the confidence factor associated with the obtained location-based identifier exceeds the minimum threshold at block 802 or after a default location-based identifier is assigned at block 804, the receiving DNS server determines a destination identifier for the DNS query at block 806.

However, in an alternative embodiment, the foregoing functionality associated with obtaining and analyzing the confidence factor may be eliminated. In one embodiment, this functionality may instead be implemented as a preprocessing step such that the query IP address to location-based identifier mappings provided in the data store 134 already take a confidence assessment into consideration. For example, prior to generating the query IP address to location-based identifier mappings, any data mapping entry having a low confidence factor may be filtered out of the data mappings. The filtered query IP address to location-based identifier mappings may then be used by the CDN service provider 106 to determine a destination identifier at block 806.

Returning to block 806 of FIG. 8, in one embodiment, the receiving DNS server determines the destination identifier according to a manually generated table from the data store 134 in which the destination identifier is determined as a function of the location-based identifier. However, the receiving DNS server can also provide an alternative destination identifier in accordance with a manually initiated administrative process. One embodiment of the selection of the initial destination identifier and the manually initiated administrative process follows.

In an illustrative embodiment, the receiving DNS server utilizes the manually generated table mapping location-based identifiers to destination identifiers based on vector mapping and additional CDN administrator manipulation. The destination identifier corresponds to a definition of a geographic region encompassing one or more locations (e.g., a West Coast destination encompassing the states of Washington, Oregon and California). However, the DNS server may be configured to override the default destination identifier in accordance with a manually configured exception process determined as a function of the identity of the content provider (as obtained through the content provider identifier included in the DNS query).

In one embodiment, a CDN administrator can override the allocation of a destination identifier for specific content provider identifiers. For example, the DNS server can utilize the content provider identifier to ensure that the content provider's subscription with CDN service provider 106 allows content to be served from the destination identified in the mapping table. As another example, the content provider identifier can be manually designated to be associated with an alternative destination identifier to redistribute at least a portion of incoming resource requests for a particular content provider among several POPs (e.g., to avoid servicing content requests for a single web page via a single destination by offloading to a different destination).

Next, at block 808, based on the selected destination identifier, the receiving DNS server selects a POP from a list of one or more POPs that have been manually determined by the CDN administrator to be capable of servicing resource requests for the identified destination. If more than one POP is identified in the list of POPs, the receiving DNS server can select a specific POP according a specified distribution allocation for the corresponding destination (e.g., POP A (75%); POP B (25%)). The defined distribution allocation can be defined specifically based on a particular location-based identifier or destination identifier. Such distribution allocations can be modified based on processed performance data as discussed above.

The receiving DNS server then determines whether the selected POP is available at decision block 810. In one embodiment, the DNS server evaluates the availability of the selected POP using POP health information indicative of the availability of the selected POP to process incoming resource requests. If the selected POP is available (as indicated via the POP health information), the receiving DNS server maintains the POP selection from block 808. Accordingly, the process will return to decision block 708 of FIG. 7, where if the receiving DNS server is not authoritative, the receiving DNS server returns a CNAME that will result in the receipt of the DNS query by the selected POP (or one of a set of identified POPs). If, however, the selected POP corresponds to the current POP of the receiving DNS server (i.e., the receiving DNS server is authoritative), the receiving DNS server resolves the DNS query by returning the IP address of the default resource cache component at the POP as the CNAME does not necessarily need to be provided (unless additional request routing processing will be implemented).

If the selected POP is not available (as indicated via the POP health information), the receiving DNS server can select an alternative POP at block 814 to process the DNS query. In one embodiment, the alternative POP can be selected via a failover list of alternative POPs that is manually set by a CDN administrator. Specifically, the receiving DNS server can select a specific alternative POP from the failover list according to a specified distribution. As similarly described above, processing will then return to decision block 708 of FIG. 7, where if the receiving DNS server is not authoritative for the alternative POP, the receiving DNS server returns a CNAME that will result in the receipt of the DNS query by the selected alternative POP (or one of a set of POPs). If, however, the selected alternative POP corresponds to the current POP of the receiving DNS server (i.e., the receiving DNS server is authoritative), the receiving DNS server resolves the DNS query by returning the IP address of the default resource cache component at the alternative POP as the CNAME does not necessarily need to be provided (unless additional request routing processing will be implemented).

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable medium storing the computer executable components such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A computer-implemented method comprising:
obtaining a first domain name system (DNS) query from a client computing device at a first DNS server, wherein the first DNS query is associated with a first requested resource and wherein the first DNS server is associated with a content delivery network service;

obtaining a query internet protocol (IP) address associated with the first DNS query at the first DNS server, wherein the query IP address is associated with the client computing device;

obtaining, at the first DNS server from a data store, an identifier from a plurality of identifiers based, at least in part, on a portion of the obtained query IP address, wherein the data store includes at least one partial IP address to identifier mapping, and wherein the data store further includes network points of presence mappings to at least one of the plurality of identifiers; and resolving the first DNS query based on the identifier.

2. The method as recited in claim 1, wherein the identifier is different from the obtained query IP address associated with the first DNS query.

3. The method as recited in claim 1, wherein the query IP address being associated with the client computing device comprises a query IP address corresponding to a local DNS resolver of the client computing device.

4. The method as recited in claim 1 further comprising:
collecting performance data associated with transmission of the first requested resource; and
updating routing information in the data store and associated with the query IP address, the updating of the routing information based on the performance data.

5. The method as recited in claim 4, wherein updating routing information in the data store comprises updating a confidence factor corresponding to the at least one partial IP address to identifier mapping associated with the query IP address.

6. The method as recited in claim 4, wherein updating routing information in the data store comprises modifying the data store with an updated destination identifier corresponding to the identifier associated with the query IP address.

7. The method as recited in claim 4, wherein the data store further includes network points of presence mappings to at least one of the identifiers.

8. The method as recited in claim 4, wherein updating routing information in the data store comprises modifying the data store with an updated network point of presence mapping.

9. A computer system comprising:
a data store including internet protocol (IP) address to identifier mappings, wherein the IP address to identifier mappings include at least one partial IP address to identifier mapping, and wherein the data store includes a plurality of identifiers and network point of presence mappings to at least one of the plurality of identifiers; and
a first network point of presence associated with a content delivery network service provider, wherein the first network point of presence comprises at least one computing device and is operative to:
obtain a first domain name system (DNS) query from a client computing device at a first DNS server, wherein the first DNS query is associated with a first requested resource and wherein the first DNS server is associated with a content delivery network service;
obtain a query IP address associated with the first DNS query at the first DNS server, wherein the query IP address is associated with the client computing device;
obtain, at the first DNS server from the data store, an identifier from the plurality of identifiers based, at least in part, on a portion of the obtained query IP address; and
resolve the first DNS query based on the identifier.

10. The system as recited in claim 9, wherein the identifier is different from the obtained query IP address associated with the first DNS query.

11. The system as recited in claim 9, wherein the query IP address being associated with the client computing device comprises a query IP address corresponding to a local DNS resolver of the client computing device.

12. The system as recited in claim 9, wherein obtaining the identifier comprises matching a portion of the query IP address with a partial IP address identified in the at least one partial IP address to identifier mapping in the data store.

13. The system as recited in claim 9, wherein the data store includes a full IP address to identifier mapping, and wherein obtaining the identifier comprises matching a portion of the query IP address with a portion of the full IP address identified in the full IP address to identifier mapping in the data store.

14. The system as recited in claim 9, wherein the data store includes a full IP address to identifier mapping, and wherein obtaining the identifier comprises partially matching the query IP address with a full IP address identified in the full IP address to identifier mapping in the data store.

15. The system as recited in claim 9, wherein the first network point of presence is further operative to:
collect performance data associated with transmission of the first requested resource; and
update routing information in the data store and associated with the query IP address, the updating of the routing information based on the performance data.

16. The system as recited in claim 15, wherein updating routing information in the data store comprises updating a confidence factor corresponding to the at least one partial IP address to identifier mapping associated with the query IP address.

17. The system as recited in claim 15, wherein updating routing information in the data store comprises modifying the data store with an updated destination identifier corresponding to the identifier associated with the query IP address.

18. A non-transitory computer readable storage medium storing computer executable instructions that when executed by a processor perform operations comprising:
obtaining a first domain name system (DNS) query from a client computing device at a first DNS server, wherein the first DNS query is associated with a first requested resource and wherein the first DNS server is associated with a content delivery network service;
obtaining a query internet protocol (IP) address associated with the first DNS query at the first DNS server, wherein the query IP address is associated with the client computing device;
obtaining, at the first DNS server from a data store, an identifier from a plurality of identifiers based on a portion of the obtained query IP address, wherein the data store includes at least one partial IP address to identifier mapping, and wherein the data store further includes network points of presence mappings to at least one of the plurality of identifiers; and
resolving the first DNS query based on the identifier.

19. The non-transitory computer readable storage medium as recited in claim 18, wherein obtaining the identifier comprises matching a portion of the query IP address with a partial IP address identified in the at least one partial IP address to identifier mapping in the data store.

20. The non-transitory computer readable storage medium as recited in claim 18, wherein the data store includes a full IP address to identifier mapping, and wherein obtaining the identifier comprises matching a portion of the query IP address with a portion of the full IP address identified in the full IP address to identifier mapping in the data store.

21. The non-transitory computer readable storage medium as recited in claim 18, wherein the data store includes a full IP address to identifier mapping, and wherein obtaining the identifier comprises partially matching the query IP address with a full IP address identified in the full IP address to identifier mapping in the data store.

22. The non-transitory computer readable storage medium as recited in claim 18, wherein the computer executable instructions that when executed by a processor perform operations further comprising:
- collecting performance data associated with transmission of the first requested resource; and
- modifying the data store based on the performance data with an updated identifier associated with the query IP address.

\* \* \* \* \*